(12) United States Patent
Lin

(10) Patent No.: US 7,118,257 B2
(45) Date of Patent: Oct. 10, 2006

(54) VEHICLE WINDOW SHIELD

(75) Inventor: Kuo-Hsing Lin, Chanhua Hsien (TW)

(73) Assignee: Keng Lien Industrial Co., Ltd., Taichung (TW)

( * ) Notice: Subject to any disclaimer, the term of this patent is extended or adjusted under 35 U.S.C. 154(b) by 44 days.

(21) Appl. No.: 11/041,962

(22) Filed: Jan. 26, 2005

(65) Prior Publication Data

US 2006/0164848 A1     Jul. 27, 2006

(51) Int. Cl.
*B60Q 1/00*     (2006.01)
*B60Q 1/26*     (2006.01)

(52) U.S. Cl. ...................... 362/503; 362/368; 362/545; 362/549; 362/649

(58) Field of Classification Search ................ 362/503, 362/545, 649, 549, 368
See application file for complete search history.

(56) References Cited

U.S. PATENT DOCUMENTS

| | | | | |
|---|---|---|---|---|
| 5,289,353 A | * | 2/1994 | Sasajima et al. | 362/549 |
| 6,015,223 A | * | 1/2000 | Kidd et al. | 362/503 |
| 6,116,678 A | * | 9/2000 | Beck | 296/146.15 |
| 2004/0252520 A1 | * | 12/2004 | Martineau et al. | 362/545 |

* cited by examiner

*Primary Examiner*—Sandra O'Shea
*Assistant Examiner*—James W Cranson, Jr.
(74) *Attorney, Agent, or Firm*—Egbert Law Offices

(57) ABSTRACT

A vehicle window shield has a body and an illumination device. The body has a protruding surface, a lip, a mounting hole and an adhesive layer. The adhesive layer is attached to the vehicle window frame. The illumination device in mounted inside the mounting hole in the body and connected to a corresponding turn signal of the vehicle. When vehicle window shield is used, the illumination device will light with the turn signal, and the assembly of the vehicle window shield is simple.

11 Claims, 7 Drawing Sheets

VEHICLE WINDOW SHIELD

BACKGROUND OF THE INVENTION

1. Field of Invention

The present invention relates to a vehicle window shield, more particularly to a vehicle window shield that has an illumination device.

2. Description of the Related Art

With reference to FIG. 6, vehicle window shields (600) prevent rain, snow or wind from coming into vehicle windows when the windows are open a little. With further reference to FIG. 7, a conventional vehicle window shield was showed. The conventional vehicle window shield has a body (90) and an illumination device (94). The body (90) has an outer surface (not numbered), an inner surface (not numbered), a mounting recess (91), an access hole (93) and multiple through holes (92). The mounting recess (91) is defined in the outer surface of the body (90). The access hole (93) is defined in the bottom of the mounting recess (91). The through holes (92) are defined in the bottom of the mounting recess (91) around the access hole (93). The illumination device (94) is mounted inside the mounting recess (91) in the body (90) and has an inner surface (not numbered), multiple threaded studs (95), multiple nuts (not numbered) and an electric cord (96). The threaded studs (95) extend respectively through the through holes (92), and the nuts screw respectively onto the studs (95) and hold the illumination device (94) in the mounting recess (91). The electric cord (96) passes through the access hole (93) and is connected to the corresponding turn signal of the vehicle. Therefore, the vehicle window shield with the illumination device (94) lights when the corresponding turn signal is activated.

However, the conventional vehicle window shield has the following disadvantage.

The illumination device (94) is held in the body (90) by nuts screwed onto the studs (95) that must be inserted through the through holes (92). Such assembly is inconvenient.

Thus, a real need exists today for a vehicle window shield that is easy to assemble.

SUMMARY OF THE INVENTION

The primary objective of the present invention is to provide a conveniently assembled vehicle window shield.

The vehicle window shield in accordance with the present invention has a body and an illumination device. The body has a protruding surface, a lip, a mounting hole and an adhesive layer. The adhesive layer is attached to the vehicle window frame. The illumination device is mounted inside the mounting hole in the body and is connected to a corresponding turn signal of the vehicle.

The illumination device will light up with the turn signal, and assembly of the vehicle window shield is simple.

Other objectives, advantages and novel features of the invention will become more apparent from the following detailed description when taken in conjunction with the accompanying drawings.

DETAILED DESCRIPTION OF THE INVENTION

Figure 1:
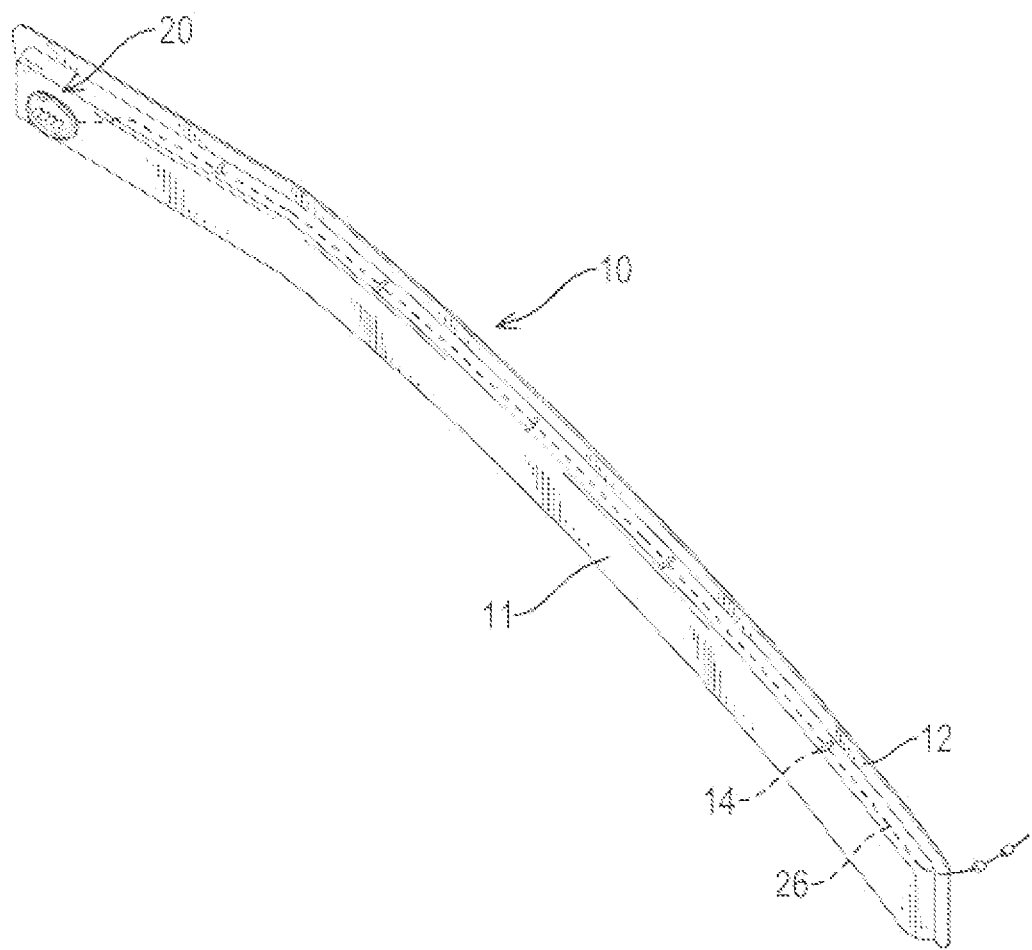
FIG. 1 is a perspective view of a first embodiment of a vehicle window shield in accordance with the present invention.
Figure 2:
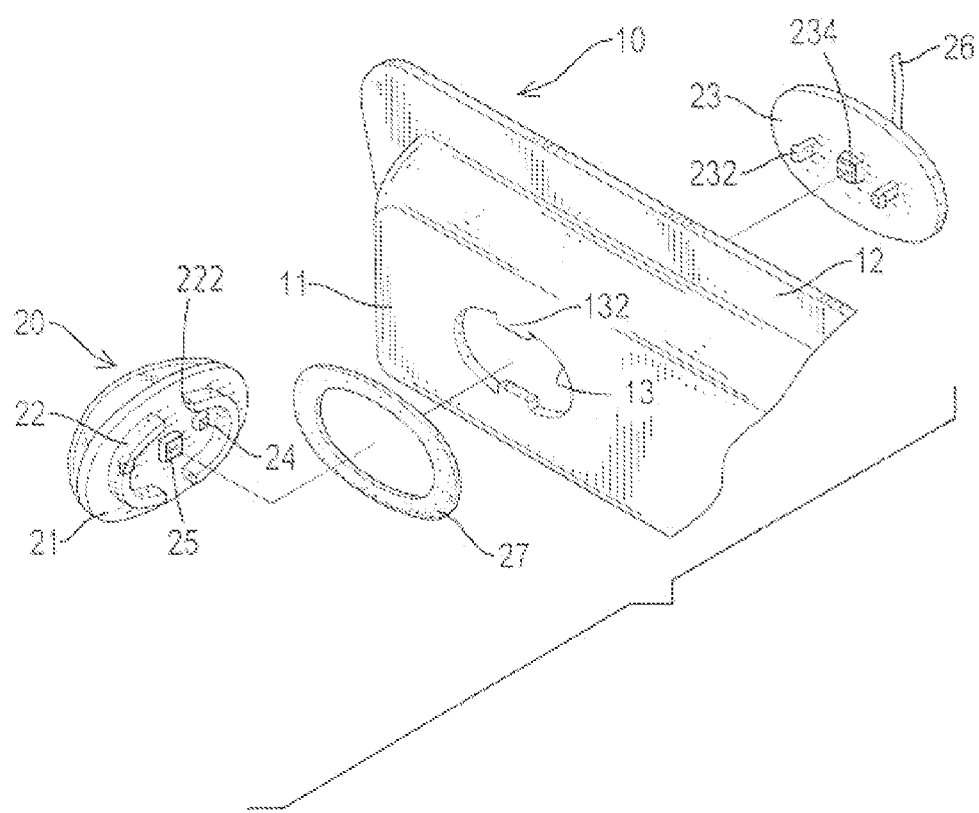
FIG. 2 is an enlarged exploded perspective view of the vehicle window shield in FIG. 1.
Figure 3:
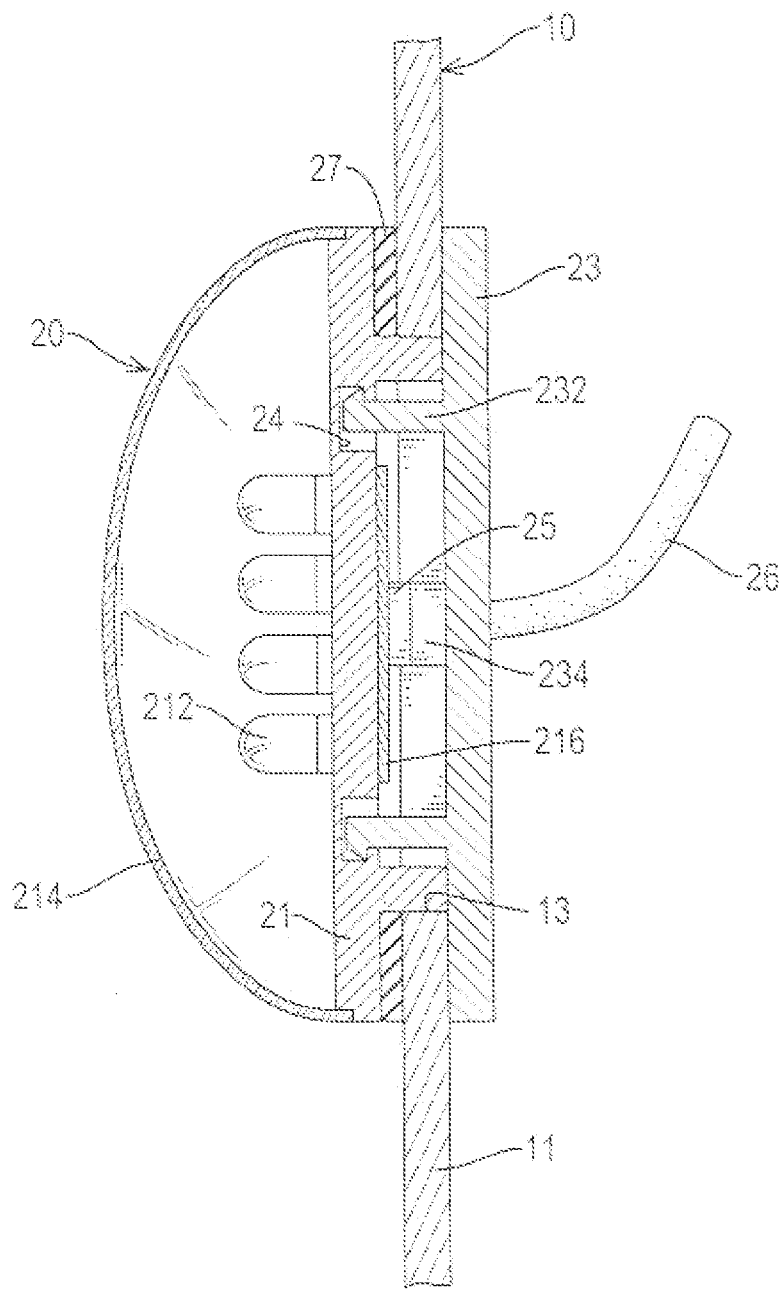
FIG. 3 is a side view in partial section of an illumination device in the vehicle window shield in FIG. 1.
Figure 4:
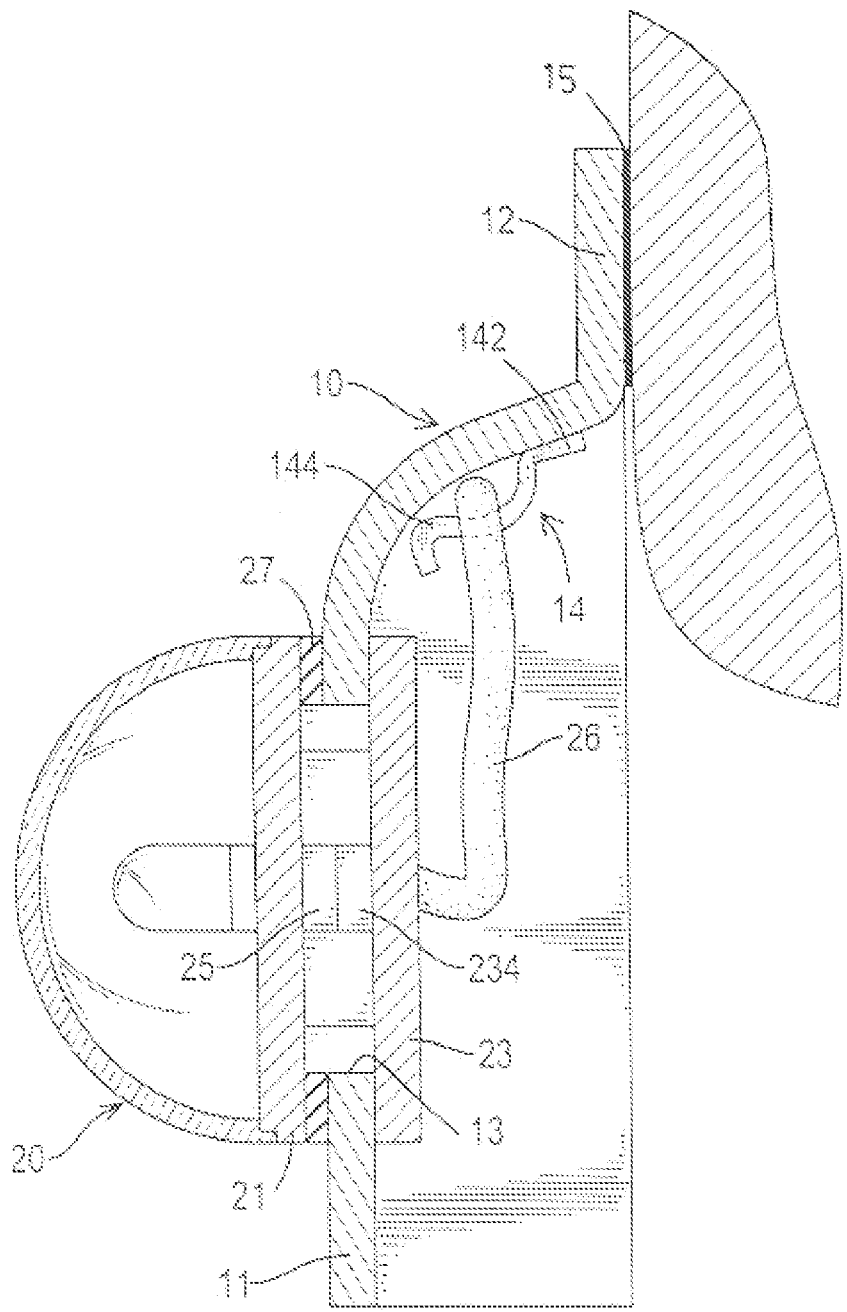
FIG. 4 is a side view in partial section of a second embodiment of an illumination device in the vehicle window shield in accordance with the present invention.

With reference to FIGS. 1 to 4, a vehicle window shield in accordance with the present invention has a body (10) and at least one illumination device (20).

The body (10) is attached to a vehicle window frame and has a protruding surface (11), a lip (12), at least one mounting hole (13), multiple optional cord keepers (14) and an adhesive layer (15).

The protruding surface (1) stands off from the window, keeps water from dripping into the vehicle through a slightly opened window and has a top edge, an outer surface and an inner surface.

The lip (12) extends up from the top edge of the protruding surface (11) and has an inner surface.

Each mounting hole (13) is defined in the protruding surface (11) and has a side edge and two optional teeth (132). The two teeth (132) are formed on and protrude in from the side edge of each mounting hole (13) opposite to each other.

The cord keepers (14) are mounted on the inner surface of the protruding surface (11), and each cord keeper (14) has a mounting tab (142) and a cord retainer (144). The mounting tab (142) is attached to the inner surface of the protruding surface (11). The cord retainer (144) abuts the inner surface of the protruding surface (11).

The adhesive layer (15) is attached to the inner surface of the lip (12) and attaches the lip (12) and the body (10) to a vehicle window frame.

The illumination devices (20) are mounted respectively in the mounting holes (13) in the body (10). Each illumination device (20) has a base (21), at least one LED (212), a globe (214), a cover (23), an optional gasket (27) and an electric cord (26).

The base (21) is mounted in the mounting hole (13) and has an outer surface, an inner surface, at least one longitudinal flange (22), at least one optional latch recess (24) and an electricity conducting device. The at least one longitudinal flange (22) is formed on the inner surface of the base (21). In a preferred embodiment, two longitudinal flanges (22) are formed on the inner surface of the base (21) and form two gaps (222) that engage the teeth (132) in the mounting hole (13). The latch recesses (24) are defined in the inner surface. The electricity conducting device includes an optional circuit board (216) and an electrical connector (25). The circuit board (216) is mounted on the inner surface of the base (21). The electrical connector (25) is connected to the circuit board (216).

The at least one LED (212) is mounted on the outer surface of the base (21) and is connected to the electricity conducting device and may be connected to the circuit board (216) or directly connected to the electrical connector (25).

The globe (214) is transparent and is mounted on the outer surface of the base (21).

The cover (23) is mounted on the inner surface of the protruding surface (11) and has an outer surface, an inner surface, a central hole, at least one optional latch (232) and an optional electrical connector (234). The at least one latch (232) is formed on the outer surface of the cover (23). The latches (232) connect respectively to the latch recesses (24) and hold the illumination device (20) on the body (10). The electrical connector (234) is mounted on the outer surface of the cover (23) and is connected to the electrical connector (25) on the base (21).

The gasket (27) is mounted between the outer surface of the protruding surface (11) and the inner surface of the base (21) to form a waterproof seal.

Figure 5:
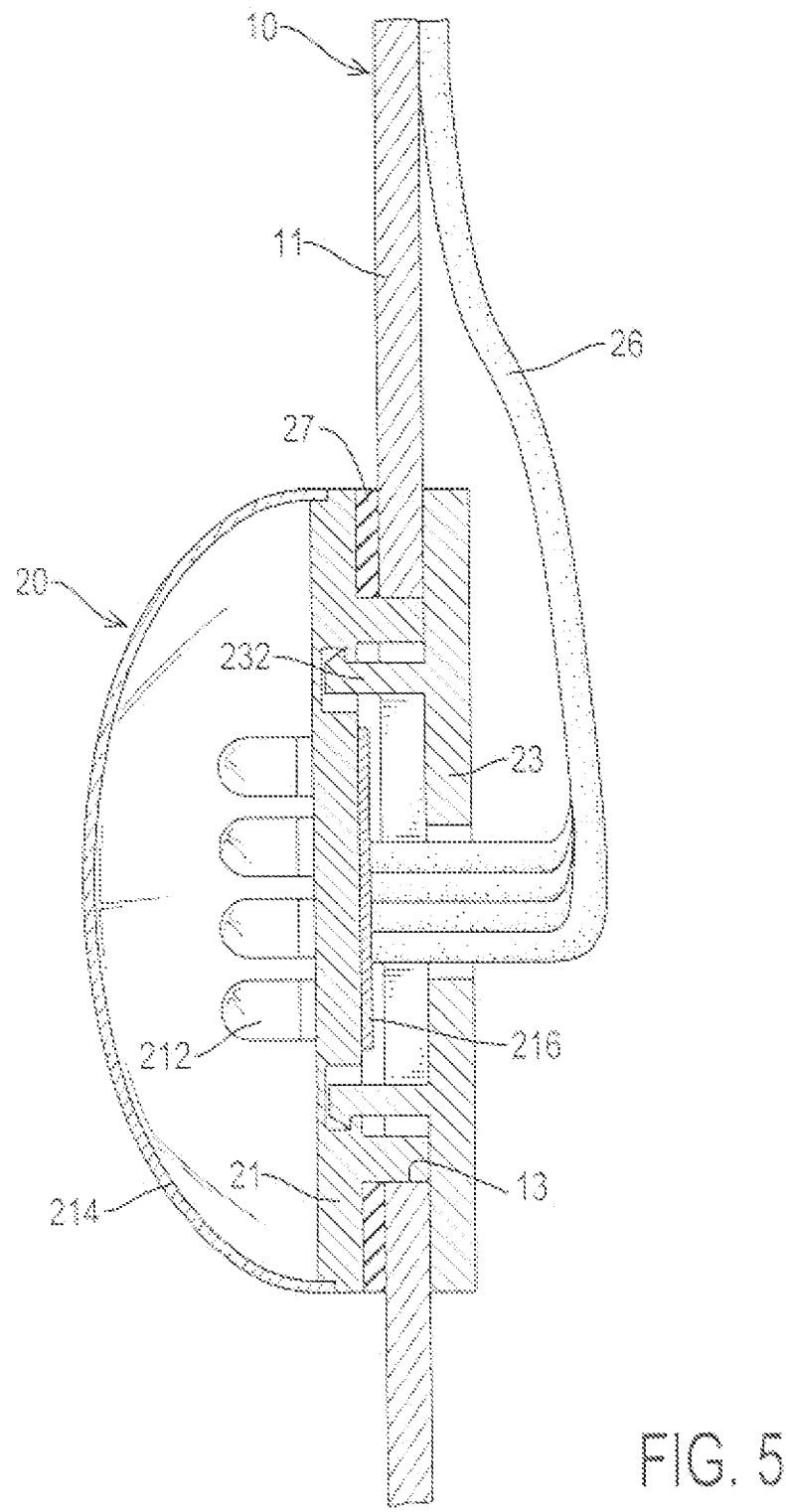
FIG. 5 is a side view in partial section of a third embodiment of an illumination device in the vehicle window shield in accordance with the present invention.
Figure 6:
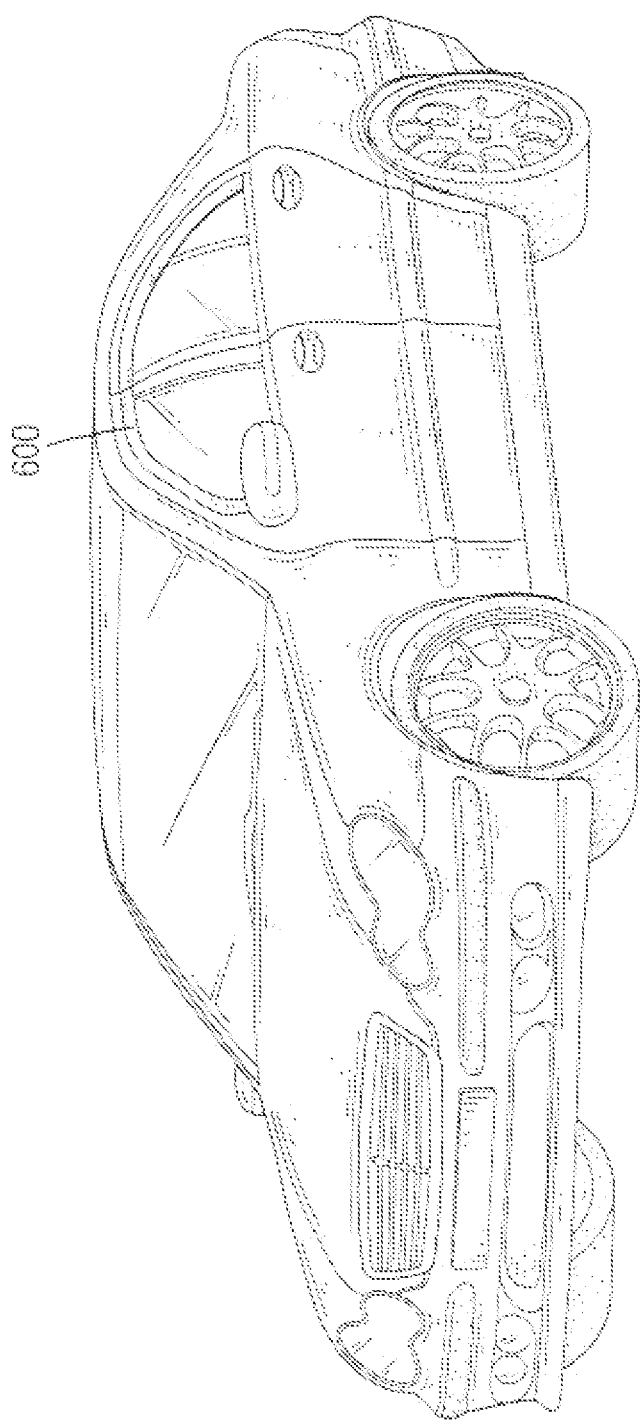
FIG. 6 is a perspective view of a conventional vehicle window shield mounted on a vehicle in accordance with the prior art.
Figure 7:
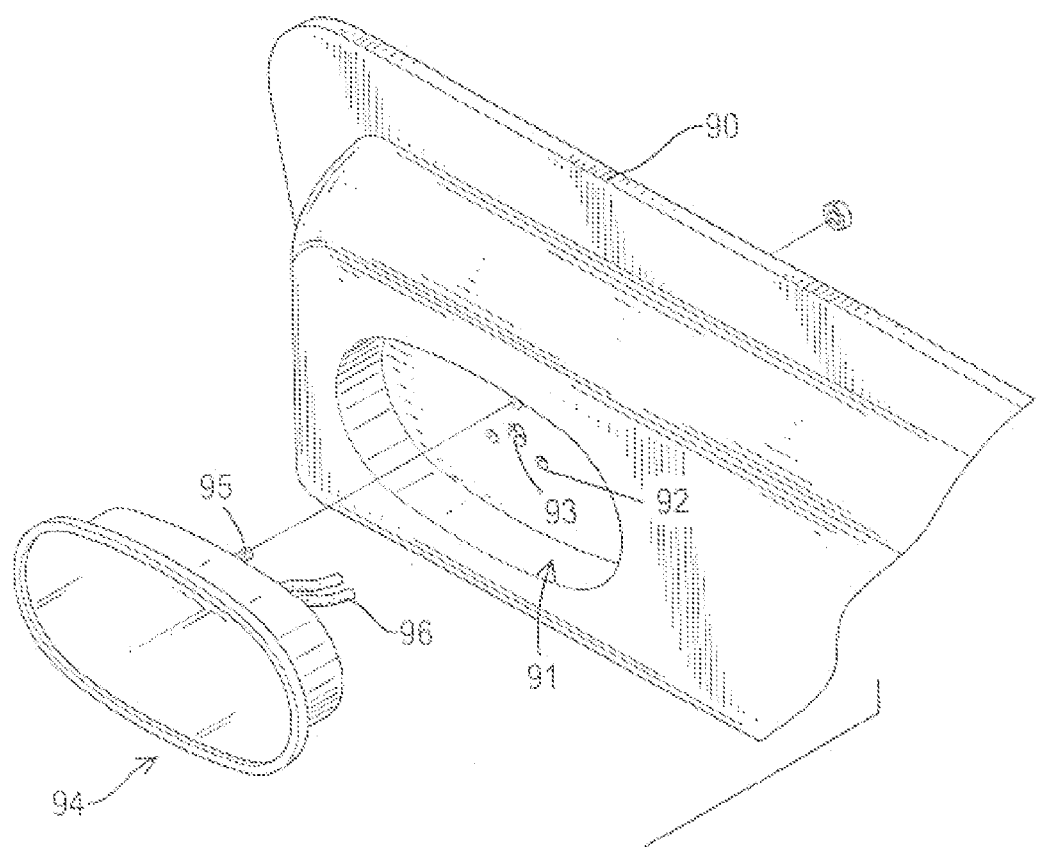
FIG. 7 is an enlarged exploded perspective view of a conventional vehicle window shield in accordance with the prior art.

With further reference to FIG. 5, the electric cord (26) connects to a corresponding turn signal of a vehicle, extends through the hole in the cover (23) and attaches to the electricity conducting device. The electricity conducting device may be an electrical connector (234) on the cover (23) or a circuit board (216) mounted on the base (21). The electric cord (26) is held against the inner surface of the protruding surface (11) by the cord retainers (144) on the cord keepers (14).

When multiple LED lamps (212) are mounted on the outer surface of the base (21), the electric cord (26) is attached to the inner surface of the protruding surface (11) and is connected to a corresponding turn signal of a vehicle.

When the vehicle window shield is used, the illumination device (20) on the vehicle window shield will light with the corresponding turn signal.

The advantages of the vehicle window shield in accordance with the present invention include the following.

1. The illumination device (20) of the vehicle window shield in accordance with the present invention is mounted on the body directly, so many through holes are not required to mount the illumination device as in the prior art. Assembly of the vehicle window shield is simple.

2. Because the illumination device is simpler to assemble than conventional ones, people can assemble or replace the illumination device effectively.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A vehicle window shield comprising
 a body having
  a protruding surface having
   a top edge,
   an outer surface and
   an inner surface,
  a lip extending up from top edge of protruding surface and having an inner surface,
  at least one mounting hole defined through the protruding surface, and each mounting hole having a side edge, and
  an adhesive layer attached to inner surface of lip, and
 at least one illumination device mounted respectively in the at least one mounting hole in the body, and each illumination device having
  a base mounted in one of the at least one mounting hole and having
   an outer surface,
   an inner surface,
   at least one longitudinal flange formed on the inner surface of base,
  an electricity conducting device mounted on illumination device,
  at least one LED mounted on the outer surface of base and connected to the electricity conducting device,
  a globe mounted on base, and
  a cover mounted on inner surface of protruding surface having
   an outer surface,
   an inner surface, and
   a central hole, and
  an electric cord connected to the electricity conducting device on illumination device.

2. The vehicle window shield as claimed in claim 1, wherein each one of the at least one mounting hole in the body further comprises
 two teeth formed on protruding surface from the side edge of the mounting hole and opposite to each other, and
 the at least one longitudinal flange on the base of one of the at least one illumination device is two longitudinal flanges formed on the inner surface and forming two gaps that engage the teeth in a corresponding mounting hole.

3. The vehicle window shield as claimed in claim 2, wherein the body further comprises
 multiple cord keepers mounted on inner surface of the protruding surface, and each cord keeper having
  a mounting tab attached to the inner surface of the protruding surface, and
  a cord retainer abutting the inner surface of the protruding surface.

4. The vehicle window shield as claimed in claim 3, wherein the base of each one of the at least one illumination device further comprises at least one latch recess defined in the inner surface of the base, and
 the cover of each one of the at least one illumination device further comprises at least one latch formed on the outer surface, connecting respectively to the at least one latch recess in a corresponding base and holding the illumination device on the body.

5. The vehicle window shield as claimed in claim 4, wherein each one of the at least one illumination device further comprises a gasket mounted between the inner surface of the base of the illumination device and the outer surface of the protruding surface.

6. The vehicle window shield as claimed in claim 1, wherein the body further comprises
 multiple cord keepers mounted on inner surface of the protruding surface, and each cord keeper having
  a mounting tab attached to the inner surface of the protruding surface, and
  a cord retainer abutting the inner surface of the protruding surface.

7. The vehicle window shield as claimed in claim 1, wherein the base of each one of the at least one illumination device further comprises at least one latch recess defined in the inner surface of the base, and
 the cover of each one of the at least one illumination device further comprises at least one latch formed on the outer surface, connecting respectively to the at least one latch recess and holding the illumination device on the body.

8. The vehicle window shield as claimed in claim 1, wherein each one of the at least one illumination device further comprises a gasket mounted between the inner surface of the base and the outer surface of the protruding surface.

9. The vehicle window shield as claimed in claim 1, wherein the electricity conducting device of each one of the at least one illumination device comprises
   a circuit board mounted on the inner surface of the base and connected to the at least one LED, and
   two electrical connectors, wherein one electrical connector is connected.

10. The vehicle window shield as claimed in claim 1, wherein the electricity conducting device of each one of the at least one illumination device comprises
    two electrical connectors, wherein one electrical connector is connected to the circuit board and the other electrical connector is mounted on the outer surface of the cover and connected to the electric cord.

11. The vehicle window shield as claimed in claim 1, wherein the electricity conducting device of each one of the at least one illumination device comprises
    a circuit board mounted on the inner surface of the base and connected to the at least one LED and the electric cord.

* * * * *